April 19, 1955　　　M. H. EMRICK　　　2,706,549
AIR COOLED CLUTCH ELEMENT FOR TAPPING ATTACHMENTS
Filed Nov. 1, 1952
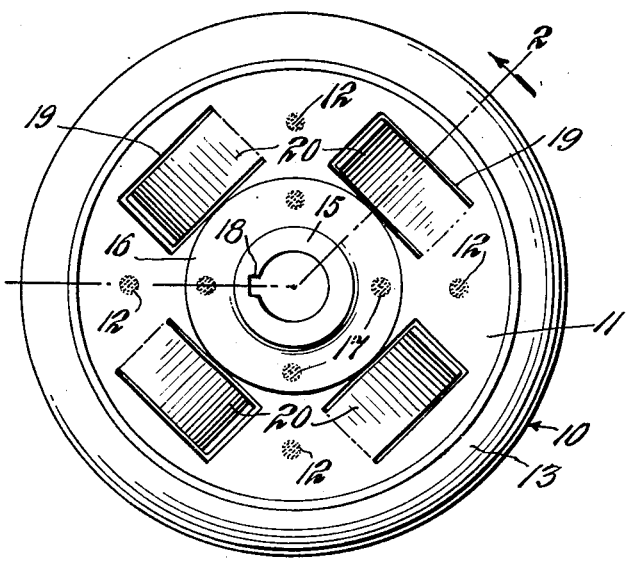
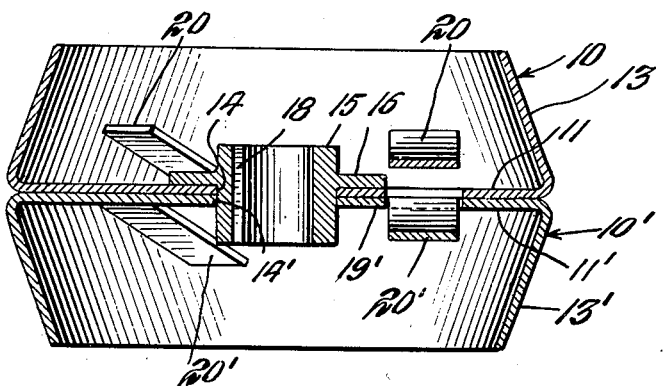
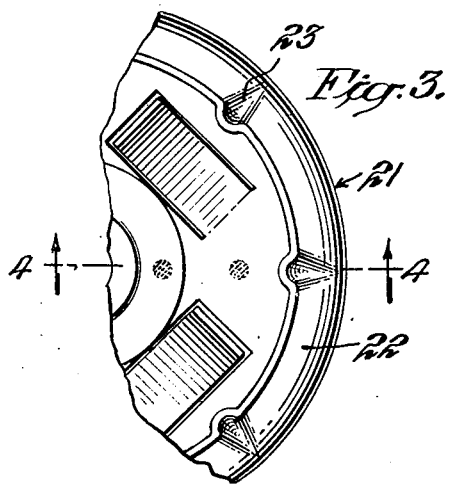
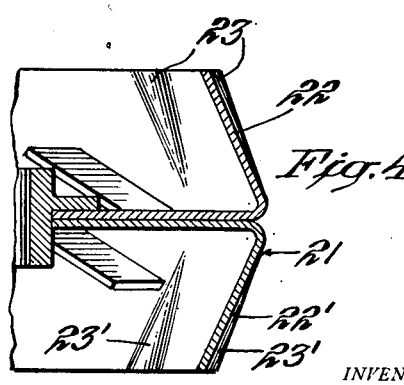
INVENTOR.
MELVIN H. EMRICK
BY Howard Thompson
ATTORNEY

United States Patent Office 2,706,549
Patented Apr. 19, 1955

2,706,549

AIR COOLED CLUTCH ELEMENT FOR TAPPING ATTACHMENTS

Melvin H. Emrick, Manhasset, N. Y.

Application November 1, 1952, Serial No. 318,214

7 Claims. (Cl. 192—113)

This invention relates to clutch devices or elements used in tapping attachments for actuating forward and reverse drive cones in actuating a tap mounted in the attachment in forward and reverse directions. More particularly, the invention deals with a clutch composed primarily of two similar cup parts secured together and including central apertures in which is arranged a hub or bearing portion.

Still more particularly, the invention deals with a clutch device, wherein each of the similar parts has adjacent walls, cut out and fashioned to form fan blades and circulating apertures for the cooling of the attachment, in which the clutch is arranged.

The novel features of the invention will be best understood from the following description, when taken together with the accompanying drawing, in which certain embodiments of the invention are disclosed, and in which the separate parts are designated by suitable reference characters in each of the views, and in which:

Fig. 1 is a plan view of one form of clutch which I employ.

Fig. 2 is a section on the broken line 2—2 of Fig. 1.

Fig. 3 is a view, similar to Fig. 1, showing only part of the construction and showing a modification; and Fig. 4 is a partial section on the line 4—4 of Fig. 3.

My present invention deals with clutch devices for tapping attachments of the type and kind disclosed in Patent Number 2,613,786 which issued October 14, 1952, and, in the accompanying drawing, the clutch is shown in its base or skeleton form, omitting the friction facings which are commonly employed on the conical or tapered walls of the clutch in establishing frictional engagement with the forward and reverse driven cones of attachments of the kind under consideration.

The clutch is formed from two similar and substantially cup-shaped bodies, or parts, 10, 10', having abutting bottom walls 11, 11' which are spot welded at intervals, as indicated at 12 in Fig. 1 of the drawing. Each part includes extending converging side walls 13, 13' forming tapered or conical bearing surfaces for engagement with the cones of the tapping attachment and outer surfaces of these walls have the usual friction material secured thereto, the latter not being shown as it forms no part of the present conception.

The walls 11, 11' have central apertures 14, 14', in which is arranged a central tubular hub or bearing 15, having an annular extending flange 16, which is welded to the wall 11, as seen at 17 in Fig. 1 of the drawing. The bore of the bearing 15 has a keyway 18 to key the clutch to a driven shaft, not shown. Each wall 11, 11' has U-shaped cuts 19, 19'. The portions within the cuts 19, 19' are offset with respect to the walls 11, 11' to form fan blades 20, 20'. In being offset, the blades will leave, within the walls 11, 11' at the cuts 19, 19', apertures for the circulation of air through the clutch body. It will be apparent that, by reason of the fact that both parts 10, 10' are identical, by arranging one upon the other in the inverted manner clearly illustrated in Fig. 2, the blades 20' are reversed with respect to that of the blades 20, thus providing a turbulence in circulation of air through the clutch to bring about efficient cooling properties of the wall structure in the operation of an attachment. In the patent heretofore mentioned, a fan device was mounted in a clutch body for the circulation of air. However, with the present construction, I provide, in a very simple and economical manner, means for producing a light and well balanced clutch, in which the fan elements or blades become an integral part of the cup casings employed in constructing the clutch.

In Figs. 3 and 4 of the drawing, I have shown a slight modification and, in these figures, 21 represents a clutch of the same general construction in all respects as the clutch shown in Figs. 1 and 2, with the exception that the walls 22, 22' have inwardly pressed and semi-conically formed indentions or ribs 23, 23' spaced circumferentially thereon to strengthen the walls 22, 22' and also to provide keying surfaces for keying certain types of facings against circumferential movement on the walls. The indentures form keyways into which the material of the facing extends. As the remainder of the structure of the clutch shown in Figs. 3 and 4 is the same as that shown in the other figures, no detailed description will be applied to the remaining parts of the modified structure.

It will be understood that the cup-shaped body parts are formed from sheet metal, which facilitates producing the lightweight and balanced resulting clutch and suitable metals can be used to care for heat flow in establishing the cooling effects which are desirable, particularly in operation of high-speed tapping attachments. I have found that steel cup bodies are suitable for this purpose, giving the required strength as well as the desirable heat disbursement properties. However, other metals may be employed. In this connection, it will also be understood that the ribs 23, in the structure shown in Figs. 3 and 4 of the drawing, will aid also in control of air circulation and disbursement of heat.

Having fully described my invention, what I claim as new and desire to secure by Letters Patent is:

1. A clutch device, comprising two cup-shaped body parts arranged one upon the other in inverted relationship and secured together to form the clutch body, each cup-shaped part having contracted peripheral walls forming, on the resulting clutch body, upper and lower bevelled surfaces, adjacent walls of the clutch body being cutout and fashioned to form circumferentially spaced blades, the blades of one cup part being directed opposite to the blades of the other cup part, said adjacent walls of the cup parts having registering center apertures, a tubular bearing arranged in said apertures and extending into each cup part, and said bearing having an angularly extending flange secured to the bottom wall of one cup part.

2. A clutch device, comprising two cup-shaped body parts arranged one upon the other in inverted relationship and secured together to form the clutch body, each cup-shaped part having contracted peripheral walls forming, on the resulting clutch body, upper and lower bevelled surfaces, adjacent walls of the clutch body being cutout and fashioned to form circumferentially spaced blades, the blades of one cup part being directed opposite to the blades of the other cup part, said adjacent walls of the cup parts having registering center apertures, a tubular bearing arranged in said apertures and extending into each cup part, said bearing having an angularly extending flange secured to the bottom wall of one cup part, the blades of one cup part being arranged above the blades of the other cup part, and the adjacent walls of the cup parts having registering apertures between said blades.

3. A clutch device, comprising two cup-shaped body parts arranged one upon the other in inverted relationship and secured together to form the clutch body, each cup-shaped part having contracted peripheral walls forming, on the resulting clutch body, upper and lower bevelled surfaces, adjacent walls of the clutch body being cutout and fashioned to form circumferentially spaced blades, the blades of one cup part being directed opposite to the blades of the other cup part, said adjacent walls of the cup parts having registering center apertures, a tubular bearing arranged in said apertures and extending into each cup part, said bearing having an angularly extendnig flange secured to the bottom wall of one cup part, and said peripheral walls of the cup parts having circumferentially spaced and inwardly extending ribs.

4. A clutch device, comprising two cup-shaped body parts arranged one upon the other in inverted relationship and secured together to form the clutch body, each cup-shaped part having contracted peripheral walls forming, on the resulting clutch body, upper and lower bevelled surfaces, adjacent walls of the clutch body being cutout and fashioned to form circumferentially spaced blades, the blades of one cup part being directed opposite to the blades of the other cup part, said adjacent walls of the cup parts having registering center apertures, a tubular bearing arranged in said apertures and extending into each cup part, said bearing having an angularly extending flange secured to the bottom wall of one cup part, said peripheral walls of the cup parts having circumferentially spaced and inwardly extending ribs, and said ribs being semi-conical in form.

5. A clutch element of the character described, comprising two similar cup-shaped bodies, each body comprising a bottom wall and inwardly contracted circumferential side walls, said cup-shaped parts being arranged in inverted relationship with the bottom walls thereof abutting and secured together, means fashioned from the bottom walls of each cup body and projecting therefrom to form circumferentially spaced fan blades and corresponding spaced apertures in the walls of the cup bodies, the apertures of both bottom walls being in alinement, and means secured to the bottom walls of the cup bodies centrally thereof and extending into each cup body to form a central shaft bearing.

6. A clutch element of the character described, comprising two similar cup-shaped bodies, each body comprising a bottom wall and inwardly contracted circumferential side walls, said cup-shaped parts being arranged in inverted relationship with the bottom walls thereof abutting and secured together, means fashioned from the bottom walls of each cup body and projecting therefrom to form circumferentially spaced fan blades and corresponding spaced apertures in the walls of the cup bodies, the apertures of both bottom walls being in alinement, means secured to the bottom walls of the cup bodies centrally thereof and extending into each cup body to form a central shaft bearing, and means for reinforcing the side walls of each cup body.

7. A clutch element of the character described, comprising two similar cup-shaped bodies, each body comprising a bottom wall and inwardly contracted circumferential side walls, said cup-shaped parts being arranged in inverted relationship with the bottom walls thereof abutting and secured together, means fashioned from the bottom walls of each cup body and projecting therefrom to form circumferentially spaced fan blades and corresponding spaced apertures in the walls of the cup bodies, the apertures of both bottom walls being in alinement, means secured to the bottom walls of the cup bodies centrally thereof and extending into each cup body to form a central shaft bearing, and the fan blades of one cup body extending in the direction opposite to the fan blades of the other cup body.

References Cited in the file of this patent

UNITED STATES PATENTS

| | | |
|---|---|---|
| 1,515,401 | Norris | Nov. 11, 1924 |
| 2,026,733 | Fast | Jan. 7, 1936 |
| 2,107,954 | Morton et al. | Feb. 8, 1938 |
| 2,109,722 | Fawick | Mar. 1, 1938 |
| 2,428,728 | Watson | Oct. 7, 1947 |

FOREIGN PATENTS

| | | |
|---|---|---|
| 117,527 | Australia | Sept. 17, 1943 |